United States Patent
Miyamoto et al.

(10) Patent No.: US 9,898,136 B2
(45) Date of Patent: Feb. 20, 2018

(54) METHOD FOR SPECIFYING TOUCHED POSITION DETERMINED BY FIRST COORDINATE ALONG FIRST SIGNAL LINE AND SECOND COORDINATE ALONG SECOND SIGNAL LINE, AND CIRCUIT FOR SPECIFYING THE TOUCHED POSITION

(71) Applicant: Sharp Kabushiki Kaisha, Osaka (JP)

(72) Inventors: Masayuki Miyamoto, Sakai (JP); Kunihiko Iizuka, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/235,574

(22) Filed: Aug. 12, 2016

(65) Prior Publication Data

US 2016/0349923 A1  Dec. 1, 2016

Related U.S. Application Data

(62) Division of application No. 14/129,068, filed as application No. PCT/JP2012/059823 on Apr. 4, 2012, now Pat. No. 9,454,271.

(30) Foreign Application Priority Data

Jun. 27, 2011 (JP) ................. 2011-142164

(51) Int. Cl.
G06F 3/041 (2006.01)
G06F 3/044 (2006.01)

(52) U.S. Cl.
CPC ............ G06F 3/0418 (2013.01); G06F 3/044 (2013.01); G06F 3/0412 (2013.01); G06F 3/0416 (2013.01); G06F 2203/04104 (2013.01)

(58) Field of Classification Search
CPC ...... G06F 3/044; G06F 3/0418; G06F 3/0416; G06F 2203/04104; G06F 3/0412; G01R 27/2605
See application file for complete search history.

(56) References Cited

U.S. PATENT DOCUMENTS 5,905,489 A    5/1999  Takahama et al.
6,323,846 B1  11/2001  Westerman
(Continued)

FOREIGN PATENT DOCUMENTS

JP    2001-125744 A    5/2001
JP    2005-114262 A    4/2005
(Continued)

OTHER PUBLICATIONS

Anonymous: "Maximum length sequence—Wikipedia", May 11, 2011 (May 11, 2011), XP055380057, Retrieved from the Internet: URL:https://en.wikipedia.org/w/index.php?title=Maximum_ length_sequence&oldid=428557650 [retrieved on Jun. 9, 2017].
(Continued)

Primary Examiner — Darlene M Ritchie
(74) Attorney, Agent, or Firm — Birch, Stewart, Kolasch & Birch, LLP

(57) ABSTRACT

A capacitance distribution detection circuit includes a multiplexer, a driver, and a sense amplifier, and the multiplexer switches states between a first connection state in which first signal lines are connected to the driver and second signal lines are connected to the sense amplifier, and a second connection state in which the first signal lines are connected to the sense amplifier and the second signal lines are connected to the driver.

5 Claims, 14 Drawing Sheets

(56) References Cited

U.S. PATENT DOCUMENTS

| | | | |
|---|---|---|---|
| 6,730,863 B1 | 5/2004 | Gerpheide et al. | |
| 7,102,364 B2 | 9/2006 | Umeda et al. | |
| 7,812,827 B2 | 10/2010 | Hotelling et al. | |
| 8,018,440 B2 | 9/2011 | Townsend | |
| 8,692,781 B2 | 4/2014 | Souchkov | |
| 8,896,328 B2* | 11/2014 | Reynolds | G06F 3/044 324/686 |
| 8,970,538 B2* | 3/2015 | Yoshida | G06F 3/044 345/173 |
| 9,342,180 B2 | 5/2016 | Westerman | |
| 2005/0073324 A1 | 4/2005 | Umeda et al. | |
| 2005/0122785 A1 | 6/2005 | Umeda et al. | |
| 2005/0141263 A1 | 6/2005 | Umeda et al. | |
| 2006/0158202 A1 | 7/2006 | Umeda et al. | |
| 2007/0109274 A1 | 5/2007 | Reynolds | |
| 2007/0257894 A1 | 11/2007 | Philipp | |
| 2009/0315858 A1 | 12/2009 | Sato et al. | |
| 2010/0060591 A1 | 3/2010 | Yousefpor et al. | |
| 2010/0085324 A1 | 4/2010 | Noguchi et al. | |
| 2010/0271319 A1 | 10/2010 | Goo | |
| 2010/0289769 A1 | 11/2010 | Watanabe | |
| 2010/0307840 A1 | 12/2010 | Kobayashi et al. | |
| 2010/0321331 A1 | 12/2010 | Oda et al. | |
| 2010/0321332 A1 | 12/2010 | Oda et al. | |
| 2010/0321333 A1 | 12/2010 | Oda et al. | |
| 2010/0321334 A1 | 12/2010 | Oda et al. | |
| 2011/0006832 A1* | 1/2011 | Land | G06F 3/044 327/517 |
| 2011/0031042 A1 | 2/2011 | Wu et al. | |
| 2011/0037724 A1 | 2/2011 | Paulsen et al. | |
| 2011/0055305 A1 | 3/2011 | Matsushima | |
| 2011/0074725 A1 | 3/2011 | Westerman et al. | |
| 2011/0080353 A1 | 4/2011 | Kang et al. | |
| 2011/0080370 A1 | 4/2011 | Wu | |
| 2011/0084927 A1 | 4/2011 | Chang et al. | |
| 2011/0084936 A1 | 4/2011 | Chang et al. | |
| 2011/0148785 A1 | 6/2011 | Oda et al. | |
| 2011/0148806 A1 | 6/2011 | Oda et al. | |
| 2011/0153263 A1 | 6/2011 | Oda et al. | |
| 2011/0242049 A1 | 10/2011 | Kuang | |
| 2012/0062498 A1 | 3/2012 | Weaver et al. | |
| 2012/0182252 A1 | 7/2012 | Brosnan | |
| 2012/0262407 A1 | 10/2012 | Hinckley et al. | |
| 2013/0044078 A1 | 2/2013 | Hallenberg | |
| 2013/0106779 A1 | 5/2013 | Bosch | |
| 2013/0120434 A1 | 5/2013 | Kim | |
| 2013/0135232 A1 | 5/2013 | Wang | |
| 2013/0257777 A1 | 10/2013 | Benko et al. | |
| 2013/0271426 A1 | 10/2013 | Yumoto et al. | |
| 2013/0314370 A1 | 11/2013 | Chang | |
| 2014/0098072 A1 | 4/2014 | Singh | |
| 2014/0132556 A1* | 5/2014 | Huang | G06F 3/0418 345/174 |
| 2017/0199663 A1* | 7/2017 | Berget | G06F 3/04883 |

FOREIGN PATENT DOCUMENTS

| | | |
|---|---|---|
| JP | 2005-134240 A | 5/2005 |
| JP | 4364609 B2 | 11/2009 |
| JP | 4387773 B2 | 12/2009 |
| JP | 2010-3048 A | 1/2010 |
| JP | 2010-92275 A | 4/2010 |
| JP | 2011-3036 A | 1/2011 |
| JP | 2011-128982 A | 6/2011 |

OTHER PUBLICATIONS

European Search Report dated Nov. 4, 2014 for corresponding European Application No. 12 80 3947.
European Search Report dated Mar. 5, 2015 in corresponding European Application No. 12802123.5.
European Search Report dated Mar. 5, 2015 in corresponding European Application No. 12803778.5.
U.S. Office Action dated May 8, 2014 for related U.S. Appl. No. 14/128,907.
U.S. Quayle Action dated Aug. 22, 2014, in related U.S. Appl. No. 14/127,932.

* cited by examiner

METHOD FOR SPECIFYING TOUCHED POSITION DETERMINED BY FIRST COORDINATE ALONG FIRST SIGNAL LINE AND SECOND COORDINATE ALONG SECOND SIGNAL LINE, AND CIRCUIT FOR SPECIFYING THE TOUCHED POSITION

This application is a Divisional of copending application Ser. No. 14/129,068, filed on Dec. 23, 2013, which was filed as PCT International Application No. PCT/JP2012/059823 on Apr. 4, 2012, which claims the benefit under 35 U.S.C. §119(a) to Patent Application No. JP2011-142164, filed in Japan on Jun. 27, 2011, all of which are hereby expressly incorporated by reference into the present application.

TECHNICAL FIELD

The present invention is related to a capacitance distribution detection method, a capacitance distribution detection circuit, a touch sensor system, and an information input/output device, each of which detects a distribution of capacitance of a plurality of capacitors that are each formed at intersections of a plurality of first signal lines with a plurality of second signal lines.

BACKGROUND ART

Patent Literature 1 discloses a capacitance distribution detection circuit that detects a distribution of capacitance of a plurality of capacitors, which capacitors are each formed at intersections of a plurality of first signal lines with a plurality of second signal lines. As shown in FIG. 1 of Patent Literature 1, a positional relationship of (i) drive lines for driving the touch panel with (ii) sense lines for reading out signals from the touch panel is fixed with respect to the touch panel.

FIG. 12 is a block diagram illustrating a configuration of a conventional touch sensor system 91. FIG. 13 is a schematic view illustrating a configuration of a touch panel 93 provided in the touch sensor system 91. The touch sensor system 91 includes the touch panel 93 and a capacitance distribution detection circuit 92. The touch panel 93 includes drive lines HL1 to HLM arranged parallel to each other in a horizontal direction, sense lines VL1 to VLM arranged parallel to each other in a vertical direction, and capacitors C11 to CMM each formed at intersections of the drive lines HL1 to HLM with the sense lines VL1 to VLM.

The capacitance distribution detection circuit 92 includes a driver 95. The driver 95 applies a voltage to the drive lines HL1 to HLM in accordance with a code sequence, to drive the capacitors C11 to CMM. The capacitance distribution detection circuit 92 includes a sense amplifier 96. The sense amplifier 96 reads out, via the sense lines VL1 to VLM, a linear sum of voltages corresponding to the capacitors C11 to CMM driven by the driver 95, and supplies this linear sum of voltages to an A/D converter 98. The A/D converter 98 converts, from analog to digital, the linear sum of voltages corresponding to the capacitors, read out via the sense lines VL1 to VLM, and supplies the converted linear sum to a capacitance distribution calculation section 99.

The capacitance distribution calculation section 99 calculates a capacitance distribution on the touch panel 93 based on (i) the linear sum of voltages corresponding to the capacitors, supplied from the A/D converter 98, and (ii) the code sequence, and supplies the calculation result to a touch recognition section 90. The touch recognition section 90 recognizes a position touched on the touch panel 93 based on the capacitance distribution supplied from the capacitance distribution calculation section 99.

The capacitance distribution detection circuit 92 includes a timing generator 97. The timing generator 97 generates a signal specifying an operation of the driver 95, a signal specifying an operation of the sense amplifier 96, and a signal specifying an operation of the A/D converter 98, and supplies these signals to the driver 95, the sense amplifier 96, and the A/D converter 98, respectively.

CITATION LIST

Patent Literature

Patent Literature 1
U.S. Pat. No. 7,812,827 (Oct. 12, 2010)

SUMMARY OF INVENTION

Technical Problem

The following description considers a case in which entry is received via a touch panel 93 of a touch sensor system 91 with an electrically conductive pen. FIG. 14 is a view describing phantom noise generated in the touch sensor system 91. It is preferable that a tip of the electrically conductive pen is sharp having a diameter of around 1 mm to 4 mm, for preventing deterioration in the sense of use. Moreover, for easy writing, it is preferable that the pen can be used in a state in which a palm of the hand is placed on a large-sized touch panel.

In the present specification, a region in which a hand holding the electrically conductive pen for input is placed on the touch panel is called a "hand placing region".

By fabricating the capacitance distribution detection circuit 92 so that a signal read out from a capacitor disposed in the hand placing region HDR (illustrated in FIG. 14) via a sense line is not received, it should be possible to input an entry with a pen at a pen input position P in a state in which the hand holding the electrically conductive pen for input is placed on the touch panel.

In the foregoing setting, a touch signal of a pen tip of the electrically conductive pen for input is extremely weaker than a touch signal of the hand placed on the touch panel, which hand holds the electrically conductive pen for input, and has a difference in SN ratio of around 10-fold to 20-fold.

Furthermore, a human body receives electromagnetic noise that exists in space, and this electromagnetic noise received by the human body from the space is inputted into the touch panel through the hand holding the electrically conductive pen for input. The electromagnetic noise inputted into the touch panel is superposed on a signal flowing through a sense line provided on which the hand holding the electrically conductive pen for input is placed. This causes generation of an error signal in a position of a sense line on which no hand is placed, as illustrated in FIG. 14 as the phantom noise NZ. As a result, a problem arises that it becomes difficult to detect the signal of the pen.

Moreover, not only limited to the input with use of a pen, there also is a problem with a smart phone when using a software keyboard (application) that if the electromagnetic noise received by the body of the user is great, the phantom noise generates on the sense line that the finger or the like of the user touches, thereby causing a key of the software keyboard that is not pressed to react.

In the present specification, error signals generated as such is called "phantom noise", where electromagnetic noise received by the human body from space is inputted into the touch panel via hands, fingers, or the like and is superposed on a signal flowing in the sense line that is touched by the hand, fingers, or the like. For example, as illustrated in FIG. 14, the phantom noise NZ generates in an area between circumscribing lines L1 and L2 which circumscribe the hand placing region HDR along the sense lines SL1 to SLM and which is outside the hand placing region HDR.

It is an object of the present invention to provide a capacitance distribution detection method, a capacitance distribution detection circuit, a touch sensor system, and an information input/output device, each of which enables eliminating an effect caused by phantom noise generated by touching a panel with a hand, finger and the like of the human body that has received electromagnetic noise.

Solution to Problem

A capacitance distribution detection method according to the present invention is a method of detecting capacitance distribution, to detect a distribution of capacitance of a plurality of capacitors that are each formed on intersections of a plurality of first signal lines with a plurality of second signal lines, the method including: driving the first signal lines in a first timing, to output from the second signal lines electric charges that correspond to the capacitors; controlling, in a second timing subsequent to the first timing, a switching of connections of the first signal lines with that of the second signal lines; and driving the second signal lines in a third timing subsequent to the second timing, to output from the first signal lines the electric charges that correspond to the capacitors.

According to this feature, in a first timing, first signal lines are driven to output from second signal lines electric charges that correspond to the capacitors, in a second timing subsequent to the first timing, switching of connection of the first and second signal lines are controlled, and in a third timing subsequent to the second timing, the second signal lines are driven to output from the first signal lines the electric charges that correspond to the capacitors. Hence, it is possible to output the electric charges corresponding to the capacitors from both of the first signal lines and the second signal lines. As a result, it is possible to eliminate the effect caused by electromagnetic noise that is inputted into the touch panel via the hand, fingers or the like and is superposed on a signal of a sense line.

A capacitance distribution detection circuit according to the present invention is a capacitance distribution detection circuit that detects a distribution of capacitance of a plurality of capacitors that are each formed on intersections of a plurality of first signal lines with a plurality of second signal lines, the capacitance distribution detection circuit including: a multiplexer connected to the plurality of first signal lines and the plurality of second signal lines; a driver connected to the multiplexer; and a sense amplifier connected to the multiplexer; the multiplexer switching a connection state between a first connection state in which the first signal lines are connected to the driver and the second signal lines are connected to the sense amplifier and a second connection state in which the first signal lines are connected to the sense amplifier and the second signal lines are connected to the driver.

With this feature, it is possible to switch between a first connection state which connects the first signal lines with the driver and connects the second signal lines with the sense amplifier and a second connection state which connects the first signal lines with the sense amplifier and connects the second signal lines with the driver. This allows for outputting the electric charges corresponding to the capacitors from both the first signal lines and the second signal lines. As a result, it is possible to eliminate the effect caused by electromagnetic noise that is inputted into the touch panel via the hands, fingers and the like and is superposed on the signal of a sense line.

Another capacitance distribution detection circuit according to the present invention is a capacitance distribution detection circuit that detects a distribution of capacitance of a plurality of capacitors that are each formed on intersections of a plurality of first signal lines with a plurality of second signal lines, the capacitance distribution detection circuit including: a first multiplexer connected to the first signal lines; a first driver connected to the first multiplexer; a first sense amplifier connected to the first multiplexer; a second multiplexer connected to the second signal lines; a second driver connected to the second multiplexer; a second sense amplifier connected to the second multiplexer; and a control circuit that controls the first multiplexer and the second multiplexer so that a connection state is switchable between a first connection state in which the first signal lines are connected to the first driver and the second signal lines are connected to the second sense amplifier, and a second connection state in which the first signal lines are connected to the first sense amplifier and the second signal lines are connected to the second driver.

With this feature, it is possible to switch over between a first connection state which connects the first signal lines with the first driver and connects the second signal lines with the second sense amplifier, and a second connection state which connects the first signal lines with the first sense amplifier and connects the second signal lines with the second driver. This allows for outputting the electric charges corresponding to the capacitors from both the first signal lines and the second signal lines. As a result, it is possible to eliminate the effect caused by electromagnetic noise that is inputted into the touch panel via the hands, fingers and the like and is superposed on the signal of the sense line.

Yet another capacitance distribution detection circuit according to the present invention is a capacitance distribution detection circuit that detects a distribution of capacitance of a plurality of capacitors that are each formed on intersections of a plurality of first signal lines with a plurality of second signal lines; the capacitance distribution detection circuit including: a first multiplexer connected to a portion of the plurality of first signal lines; a first driver connected to the first multiplexer; a first sense amplifier connected to the first multiplexer; a second multiplexer connected to another portion of the plurality of first signal lines; a second driver connected to the second multiplexer; a second sense amplifier connected to the second multiplexer; a third multiplexer connected to a portion of the plurality of second signal lines; a third driver connected to the third multiplexer; a third sense amplifier connected to the third multiplexer; a fourth multiplexer connected to another portion of the plurality of second signal lines; a fourth driver connected to the fourth multiplexer; a fourth sense amplifier connected to the fourth multiplexer; and a control circuit that controls the first to fourth multiplexers so that a connection state is switchable between (a) a first connection state in which the portion of the first signal lines is connected to the first driver, the another portion of the first signal lines is connected to the second driver, the portion of the second signal lines is connected to the third sense amplifier, and the another portion of the second signal lines is connected to the fourth sense amplifier, and (b) a second connection state in which the portion of the first signal lines is connected to the first sense amplifier, the another portion of the first signal lines is connected to the second sense amplifier, the portion of the second signal lines is connected to the third driver, and the another portion of the second signal lines is connected to the fourth driver.

With this feature, it is possible to switch between (a) a first connection state in which a portion of the first signal lines is connected to the first driver, another portion of the first signal lines is connected to the second driver, a portion of the second signal lines is connected to the third sense amplifier, and another portion of the second signal lines is connected to the fourth sense amplifier, and (b) a second connection state in which a portion of the first signal lines is connected to the first sense amplifier, another portion of the first signal lines is connected to the second sense amplifier, a portion of the second signal lines is connected to the third driver, and another portion of the second signal lines is connected to the fourth driver.

This allows for outputting the electric charges corresponding to the capacitors from both the first signal lines and the second signal lines. As a result, it is possible to eliminate the effect caused by electromagnetic noise that is inputted into the touch panel via the hands, fingers and the like and is superposed on the signal of the sense line.

A touch sensor system according to the present invention includes: the capacitance distribution detection circuit according to the present invention; and a touch panel including the plurality of first signal lines, the plurality of second signal lines, and the plurality of capacitors.

An information input/output device according to the present invention includes: the touch sensor system according to the present invention; and a display panel (i) being superposed on a touch panel provided in the touch sensor system or (ii) having the touch panel be built therein.

Advantageous Effects of Invention

A method according to the present invention of detecting a capacitance distribution drives first signal lines in a first timing to output from second signal lines electric charges that correspond to the capacitors, controls, in a second timing subsequent to the first timing, switching of connection of the first and second signal lines, and drives the second signal lines in a third timing subsequent to the second timing, to output from the first signal lines the electric charges that correspond to the capacitors. This allows for outputting the electric charges that correspond to the capacitors from both the first signal lines and the second signal lines. As a result, it is possible to eliminate the effect caused by electromagnetic noise that is inputted into the touch panel via the hands, fingers and the like and is superposed on the signal of the sense line.

DESCRIPTION OF EMBODIMENTS

Described below is an embodiment related to a touch sensor system of the present invention, with respect to FIG. 1 through FIG. 11.

(Embodiment 1)
(Configuration of Touch Sensor System 1a)

Figure 1:
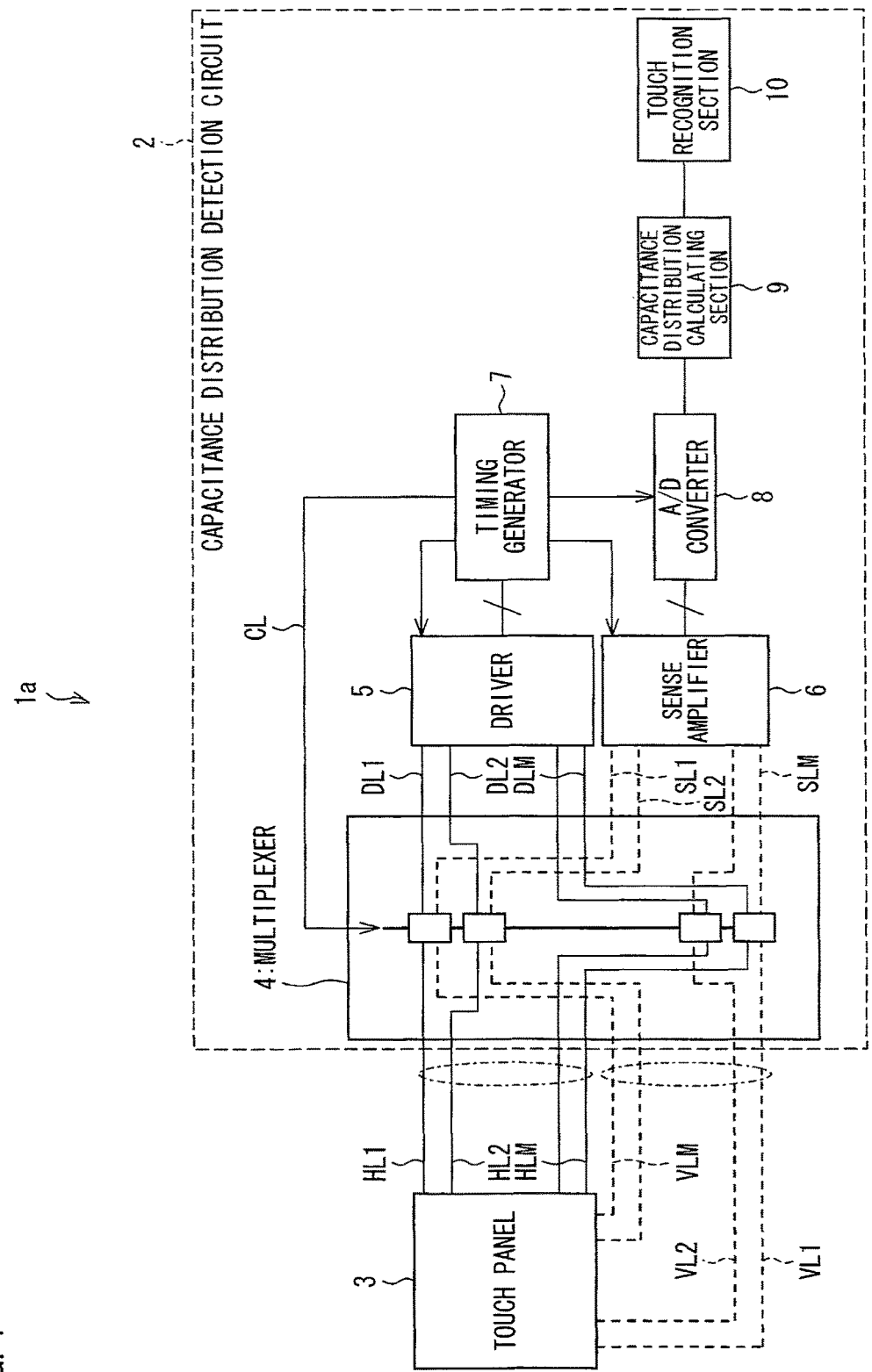
FIG. 1 is a block diagram illustrating a configuration of a touch sensor system according to Embodiment 1.
Figure 2:
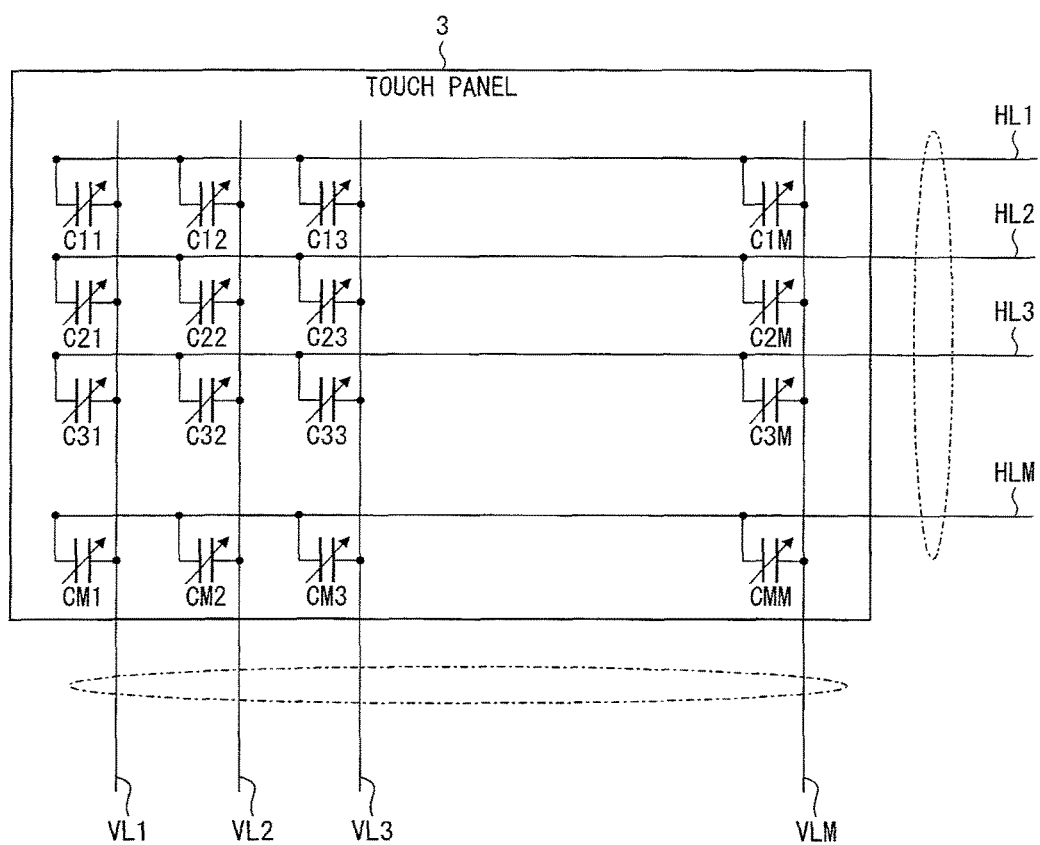
FIG. 2 is a schematic view illustrating a configuration of a touch panel provided in the touch sensor system.

FIG. 1 is a block diagram illustrating a configuration of a touch sensor system 1a according to Embodiment 1. FIG. 2 is a schematic view illustrating a configuration of a touch panel 3 provided in the touch sensor system 1a.

The touch sensor system 1a includes a touch panel 3 and a capacitance distribution detection circuit 2. The touch panel 3 includes signal lines HL1 to HLM (first signal lines) arranged parallel to each other in a horizontal direction, signal lines VL1 to VLM (second signal lines) arranged parallel to each other in a vertical direction, and capacitors C11 to CMM each provided at intersections of the signal lines HL1 to HLM with the signal lines VL1 to VLM. It is preferable that the touch panel 3 is of a size in which a hand holding the input pen can be placed on the touch panel 3. However, the touch panel 3 may be of a size that is usable for smart phones.

The capacitance distribution detection circuit 2 includes a driver 5. The driver 5 applies a voltage to drive lines DL1 to DLM in accordance with a code sequence. The capacitance distribution detection circuit 2 includes a sense amplifier 6. The sense amplifier 6 reads out, via the sense lines SL1 to SLM, a linear sum of electric charges that correspond to the capacitors, and supplies the linear sum to an A/D converter 8.

Figure 3:
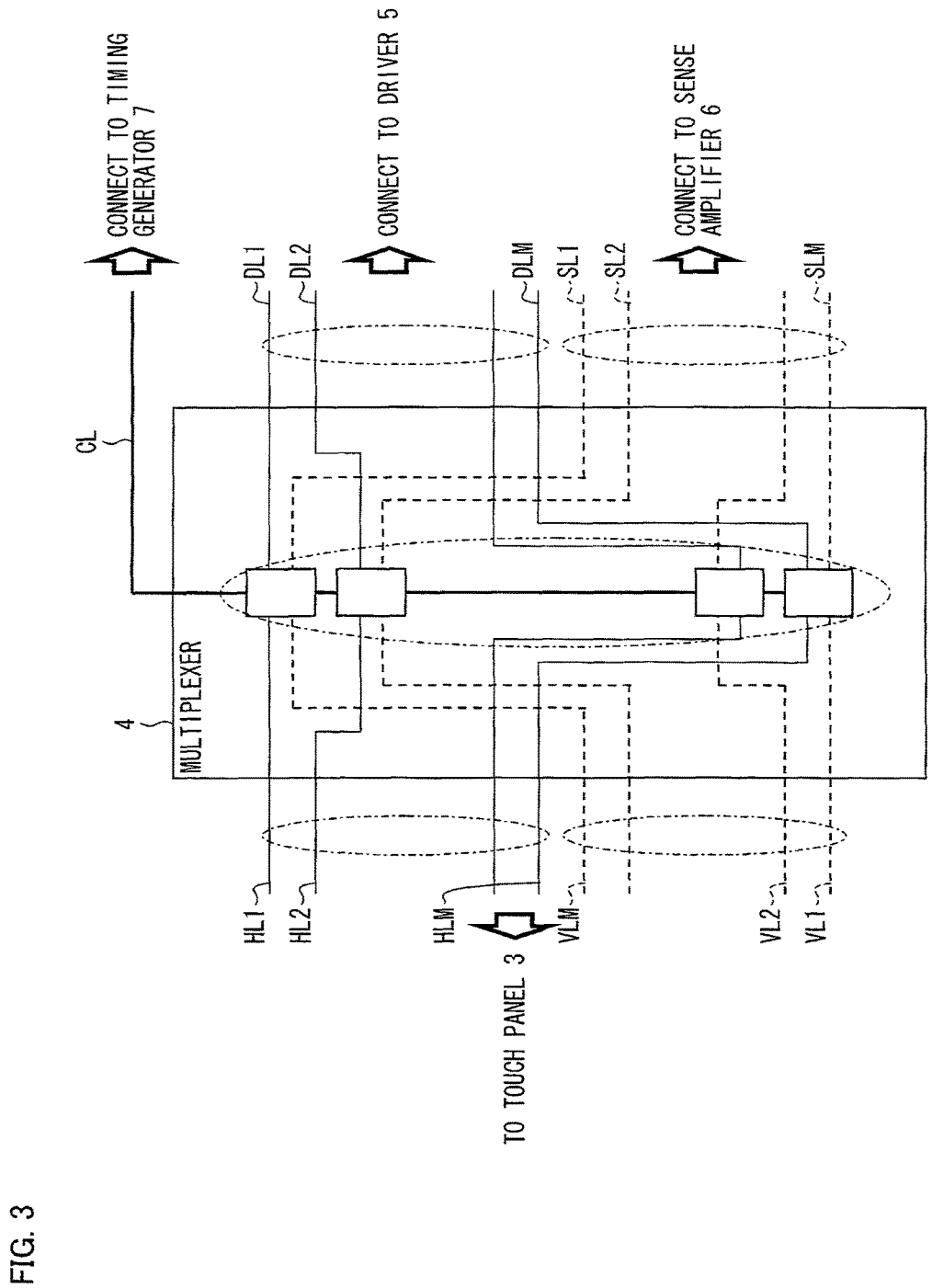
FIG. 3 is a circuit diagram illustrating a configuration of a connection switching circuit between (a) signal lines connected to the touch panel, and (b) drive lines connected to a driver and sense lines connected to a sense amplifier.

The capacitance distribution detection circuit 2 includes a multiplexer 4. FIG. 3 is a circuit diagram illustrating a configuration of a connection switching circuit between (a) signal lines HL1 to HLM and VL1 to VLM connected to the touch panel 3, and (b) drive lines DL1 to DLM connected to the driver 5 and sense lines SL1 to SLM connected to the sense amplifier 6.

The multiplexer 4 causes a switchover between (a) a first connection state in which the signal lines HL1 to HLM are connected to the drive lines DL1 to DLM of the driver 5 and the signal lines VL1 to VLM are connected to the sense lines SL1 to SLM of the sense amplifier 6 and (b) a second connection state in which the signal lines HL1 to HLM are connected to the sense lines SL1 to SLM of the sense amplifier 6 and the signal lines VL1 to VLM are connected to the drive lines DL1 to DLM of the driver 5.

Figure 4:
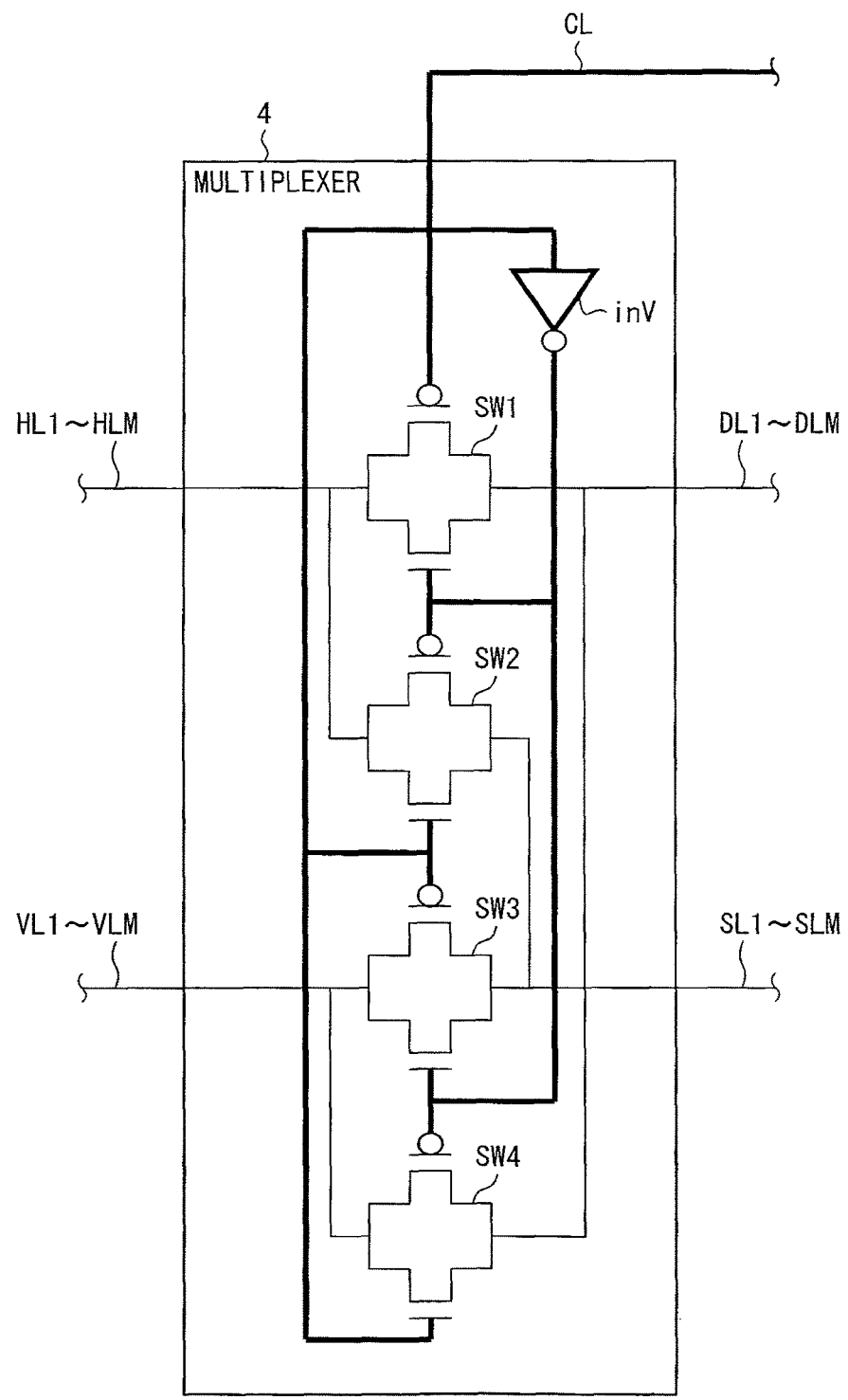
FIG. 4 is a circuit diagram illustrating a configuration of a multiplexer provided in a capacitor distribution detection circuit of the touch sensor system.

FIG. 4 is a circuit diagram illustrating a configuration of the multiplexer 4 provided in the capacitor distribution detection circuit 2 of the touch sensor system 1a. The multiplexer 4 includes four CMOS switches SW1 to SW4, which are connected in series. A signal from a timing generator 7 via the control line CL is supplied from (i) one end of the CMOS switch SW1 opposite of the CMOS switch SW2, (ii) between the CMOS switch SW2 and the CMOS switch SW3, (iii) one end of the CMOS switch SW4 opposite of the CMOS switch SW3, and (iv) a terminal input of a reverser inv. The reverser inv has its output be supplied between the CMOS switch SW1 and the CMOS switch SW2, and between the CMOS switch SW3 and the CMOS switch SW4. The signal lines HL1 to HLM are connected to the CMOS switches SW1 and SW2. The signal lines VL1 to VLM are connected to the CMOS switches SW3 and SW4. The drive lines DL1 to DLM are connected to the CMOS switches SW1 and SW4. The sense lines SL1 to SLM are connected to the CMOS switches SW2 and SW3.

When the signal of the control line CL is made Low, the signal lines HL1 to HLM become connected to the drive lines DL1 to DLM and the signal lines VL1 to VLM become connected to the sense lines SL1 to SLM. When the signal of the control line CL is made High, the signal lines HL1 to HLM become connected to the sense lines SL1 to SLM and the signal lines VL1 to VLM become connected to the drive lines DL1 to DLM.

The A/D converter 8 converts from analog to digital a linear sum of electric charges read out via the sense lines SL1 to SLM, which electric charges correspond to the capacitors, and supplies the converted linear sum to the capacitance distribution calculation section 9.

The capacitance distribution calculation section 9, based on the code sequence and the linear sum of the electric charges supplied from the A/D converter 8, which electric charges correspond to the capacitors, calculates a capacitance distribution on the touch panel 3 and supplies the calculated capacitance distribution to a touch recognition section 10. The touch recognition section 10 recognizes a touched position on the touch panel 3 based on the capacitance distribution supplied from the capacitance distribution calculation section 9.

The capacitance distribution detection circuit 2 includes the timing generator 7. The timing generator 7 generates (i) a signal for specifying an operation of the driver 5, (ii) a signal for specifying an operation of the sense amplifier 6, and (iii) a signal for specifying an operation of the A/D converter 8, and supplies these signals to the driver 5, the sense amplifier 6, and the A/D converter 8, respectively.

(Operation of Touch Sensor System 1a)

Figure 5:
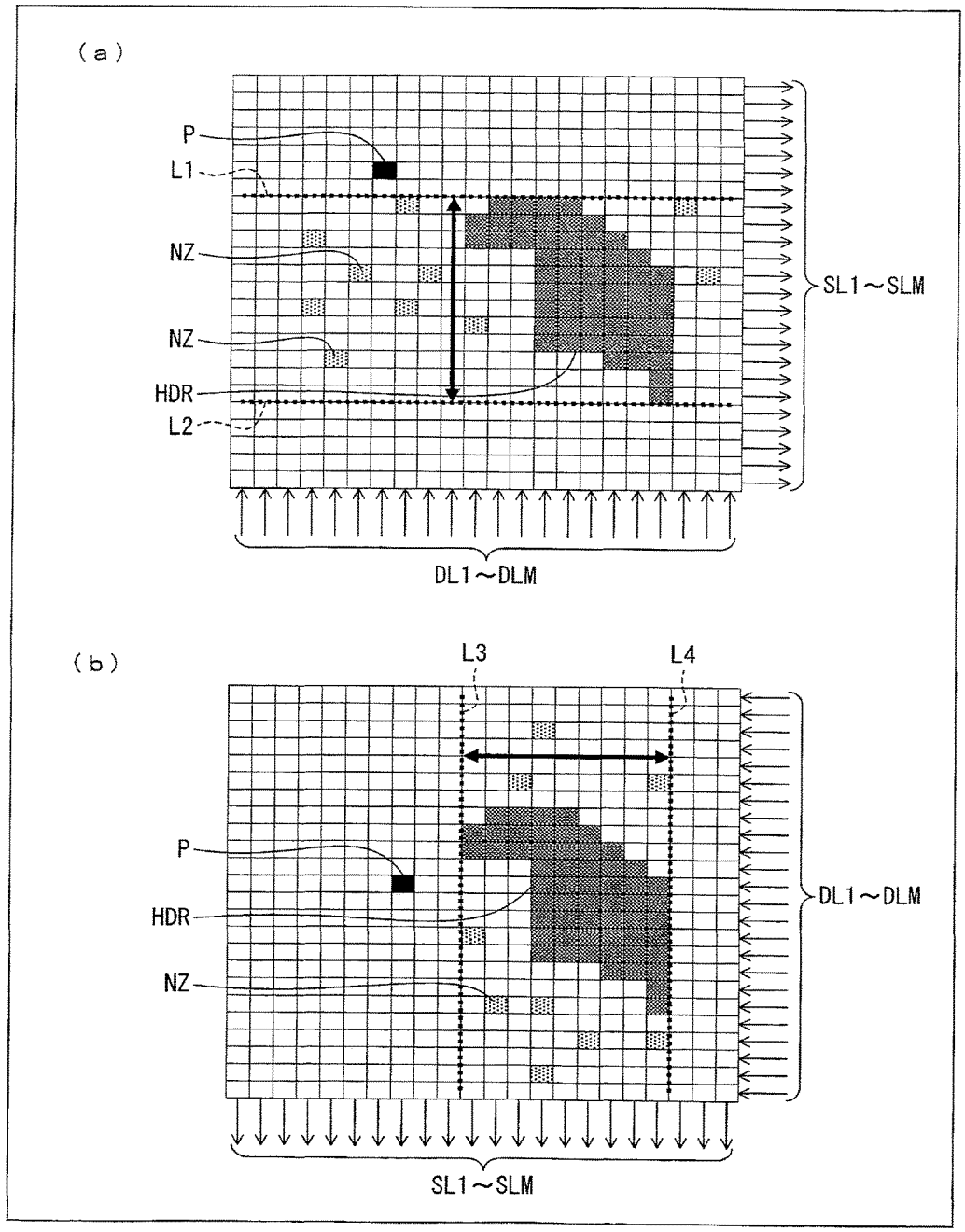
FIG. 5 Illustrated in (a) and (b) of FIG. 5 are schematic views for describing an operation method of the touch sensor system.

Illustrated in (a) and (b) of FIG. 5 is a schematic view for describing an operation method of the touch sensor system 1a. As described above with reference to FIG. 14, there is the problem that the phantom noise NZ generates in an area between the circumscribing lines L1 and L2 that circumscribe the hand placing region HDR along the sense lines SL1 to SLM and which is outside the hand placing region HDR. However, when a pen signal is inputted on a sense line that does not overlap the hand placing region HDR, i.e., on a pen input position P outside the circumscribing lines L1 and L2 as illustrated in (a) of FIG. 5, this pen signal is detectable since no phantom noise NZ is generated on the sense line that the pen input position P passes, thereby having no deterioration in SNR caused by the phantom noise NZ.

Figure 14:
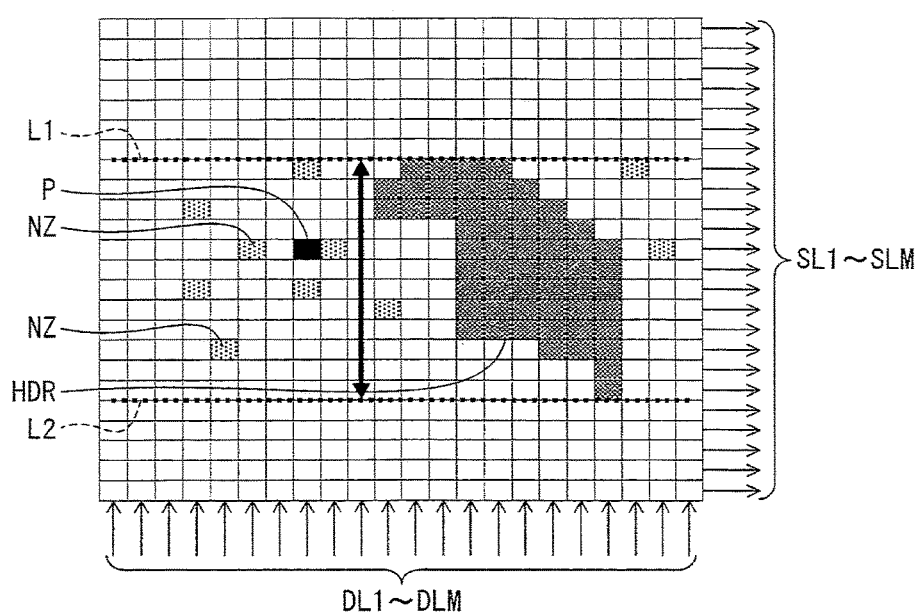
FIG. 14 is a view for describing phantom noise that generates in the touch sensor system.

Hence, in a case in which the hand placing region HDR and the pen input position P are in a positional relationship as illustrated in FIG. 14, the drive lines DL1 to DLM and the sense lines SL1 to SLM are switched over therebetween, to have the signal lines HL1 to HLM in the horizontal direction function as the drive lines DL1 to DLM and the signal lines VL1 to VLM in the vertical direction function as the sense lines SL1 to SLM, as illustrated in (b) of FIG. 5, so that the signal is detected outside the area between the circumscribing lines L3 and L4. Consequently, it is possible to detect the pen signal of the pen input position P.

Accordingly, for example, by alternately switching over with the multiplexer 4 between a first connection state ((b) of FIG. 5) and a second connection state (FIG. 14) every one frame, which first connection state is a state in which the signal lines HL1 to HLM are connected to the drive lines DL1 to DLM of the driver 5 and the signal lines VL1 to VLM are connected to the sense lines SL1 to SLM of the sense amplifier 6 and the second connection state is a state in which the signal lines HL1 to HLM are connected to the sense lines SL1 to SLM of the sense amplifier 6 and the signal lines VL1 to VLM are connected the drive lines DL1 to DLM of the driver 5, it is possible to detect the pen signal at one of timings of the first connection state and the second connection state, even if the phantom noise NZ generates due to the hand placing region HDR. Since the phantom noise NZ is generated in the other timing, the SNR of the pen signal is reduced to half. However, by alternately switching over between the first connection state and the second connection state, it is possible to detect the pen signal even if the phantom noise NZ is generated caused by the hand placing region HDR.

Therefore, for example, the touch sensor system 1a (i) drives, in a first timing, the signal lines HL1 to HLM so that the signal lines VL1 to VLM output electric charges that correspond to the capacitors (first signal line driving step), (ii) controls, with use of the multiplexer 4, in a second timing subsequent to the first timing, a switching of connection of the signal lines HL1 to HLM and the signal lines VL1 to VLM (switching step), and (iii) drives, in a third timing subsequent to the second timing, the signal lines VL1 to VLM so that the signal lines HL1 to HLM output the electric charges that correspond to the capacitors (second signal line driving step).

The capacitance distribution calculation section 9 is configured so that a signal read out through a sense line from a capacitor disposed in a rectangle circumscribing with the hand placing region HDR, is not received. The hand placing region HDR is a region in which a hand holding the electrically conductive pen for input is placed on the touch panel; the capacitance distribution calculation section 9 can be configured to recognize this region by image recognition means not illustrated. Moreover, the configuration may be provided so that a user of the touch sensor system 1a specifies the hand placing region HDR.

Moreover, when the switching between the drive lines and the sense lines similarly to the above is carried out in a smart phone with which no hand placing region HDR by pen input occurs, although a signal to be detected generated by touching with a finger is generated in either of the driving states, an error signal caused by the phantom noise is removable since a position in which the phantom noise is generated differs by the switching of the drive lines and the sense lines.

Figure 6:
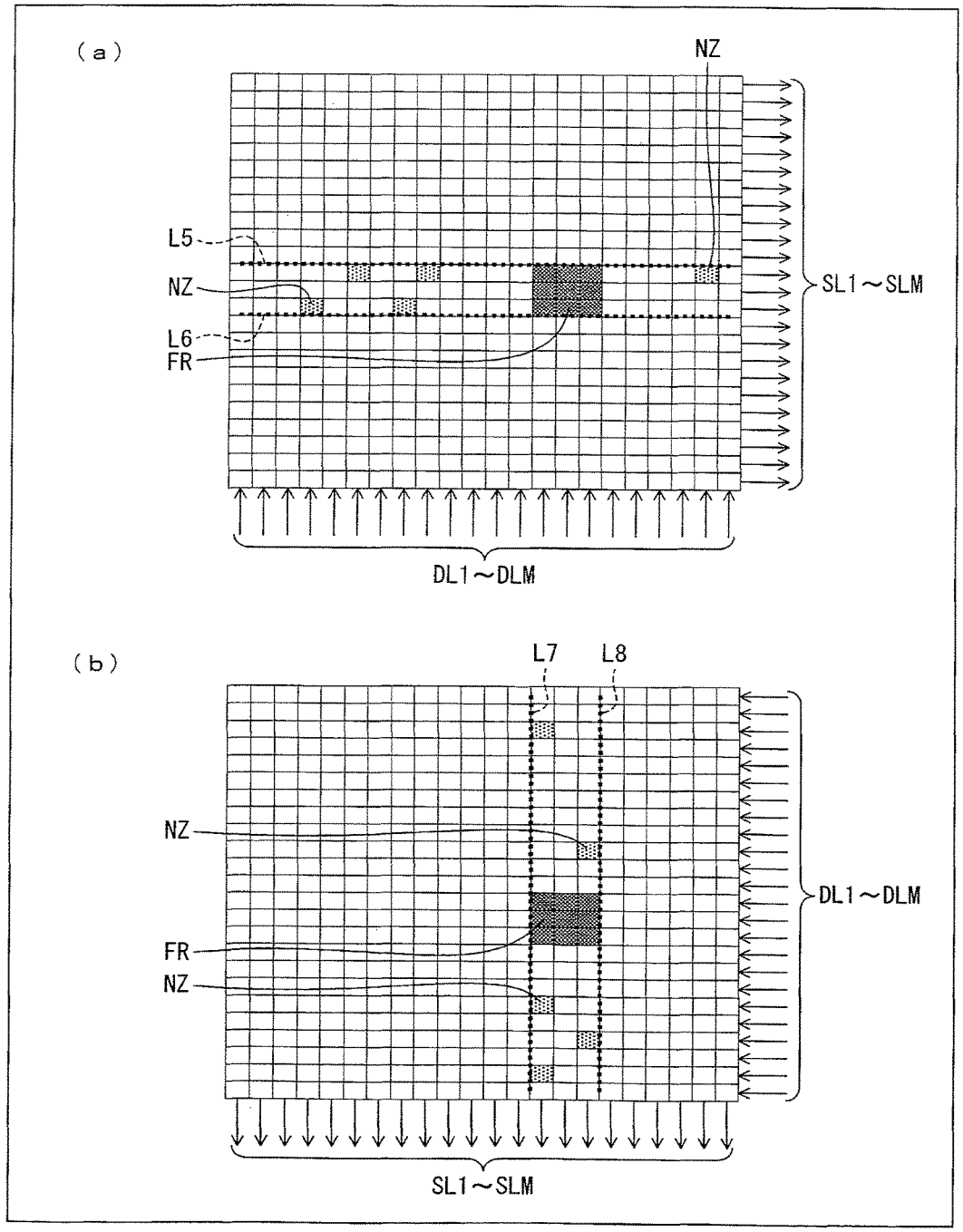
FIG. 6 Illustrated in (a) and (b) of FIG. 6 are schematic views for describing another operation method of the touch sensor system.

Illustrated in (a) and (b) of FIG. 6 are schematic views for describing another operation method of the touch sensor system 1a. As illustrated in (a) of FIG. 6, after the vertical signal lines VL1 to VLM are connected to the drive lines DL1 to DLM and vertical signal lines VL1 to VLM are driven, and the horizontal signal lines HL1 to HLM are connected to the sense lines SL1 to SLM, the phantom noise NZ that generates in an area between circumscribing lines L5 and L6 (circumscribing along a horizontal direction of a finger-touched region FR where the finger is touched) and which is outside the finger-touched region FR, is read out via the sense line together with a signal corresponding to the finger-touched region FR. Thereafter, as illustrated in (b) of FIG. 6, after the horizontal signal lines HL1 to HLM are connected to the drive lines DL1 to DLM and the horizontal signal lines HL1 to HLM are driven, and the vertical signal lines VL1 to VLM are connected to the sense lines SL1 to SLM, the phantom noise NZ generated between the circumscribing lines L7 and L8 that circumscribe the finger-touched region FR along the vertical direction, is read out via a sense line together with a signal corresponding to the finger-touched region FR.

The phantom noise NZ generated between the circumscribing lines L5 and L6 as illustrated in (a) of FIG. 6 and the phantom noise generated between the circumscribing lines L7 and L8 as illustrated in (b) of FIG. 6 are generated randomly, unrelated to each other. Accordingly, when an AND operation is carried out with use of (i) the signal corresponding to the phantom noise NZ generated between the circumscribing lines L5 and L6 as in (a) of FIG. 6, read out via the sense line, and corresponding to the finger-touched area FR, and (ii) the signal read out via the sense line, corresponding to the phantom noise NZ generated between the circumscribing lines L7 and L8 as in (b) of FIG. 6, read out via the sense line, and corresponding to the finger-touched area FR, it is possible to cancel the phantom noise NZ generated between the circumscribing lines L5 and L6 with the phantom noise NZ generated between the circumscribing lines L7 and L8.

(Embodiment 2)
(Configuration of Touch Sensor System 1b)

Figure 7:
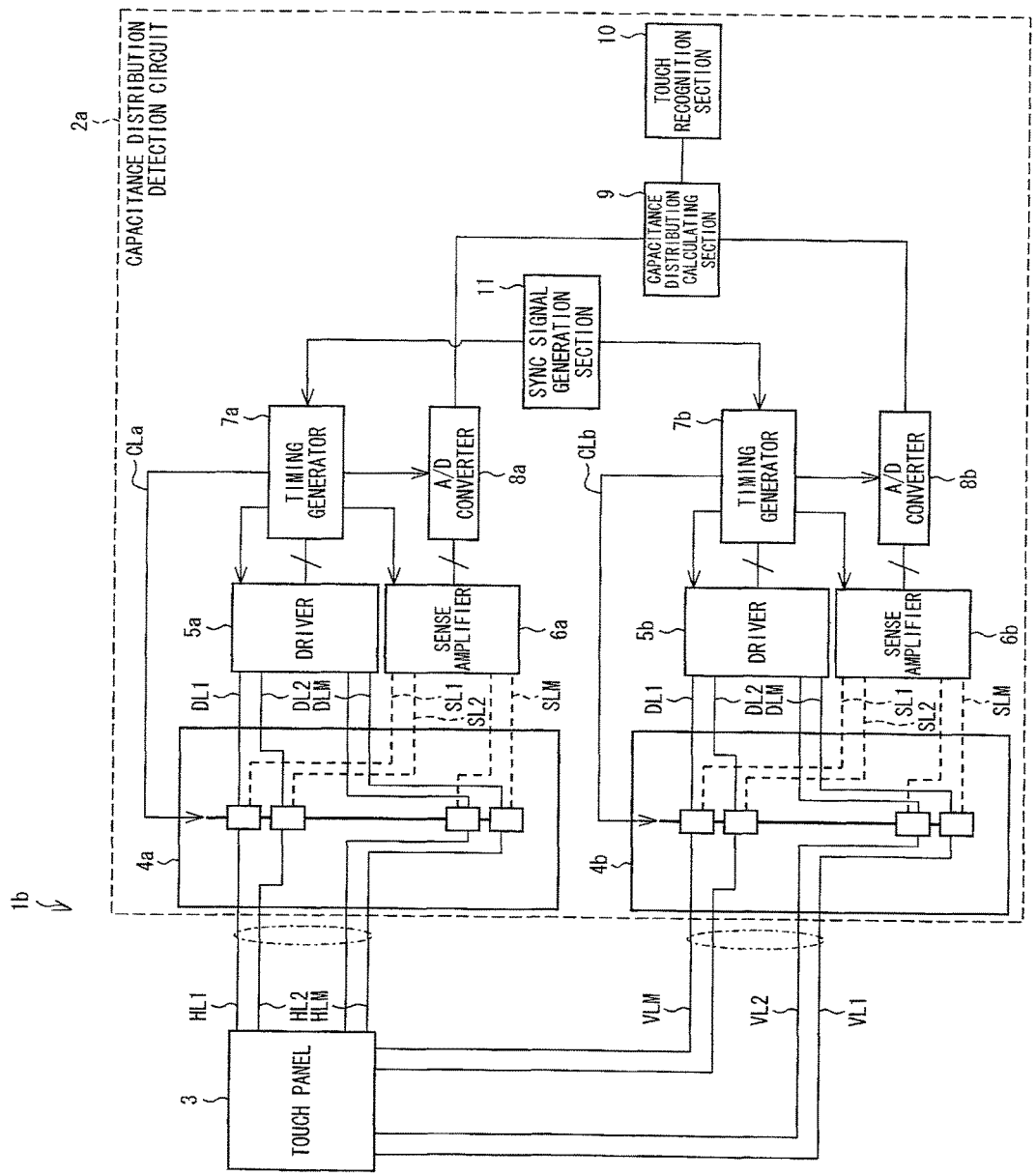
FIG. 7 is a block diagram illustrating a configuration of a touch sensor system according to Embodiment 2.
Figure 8:
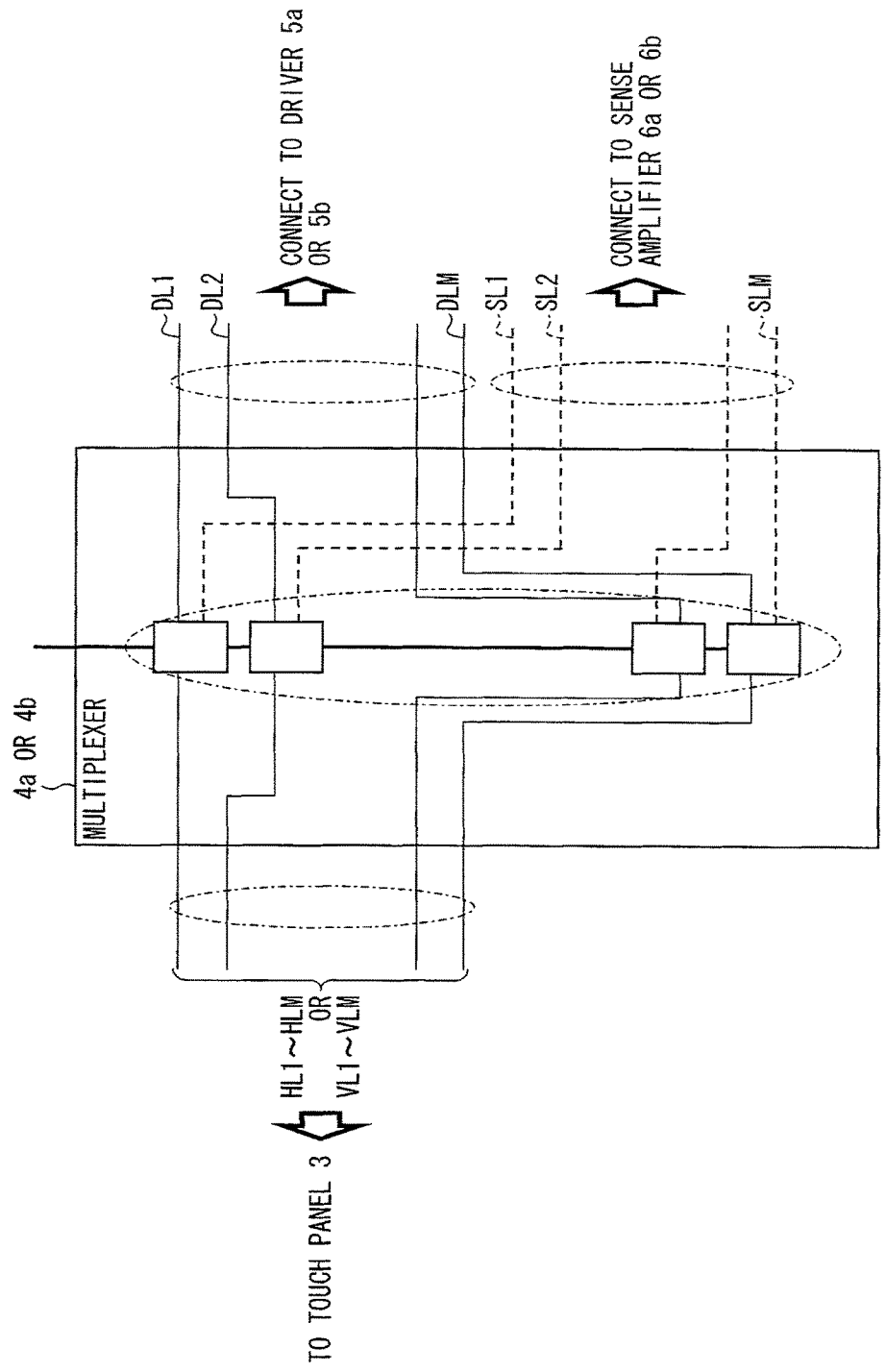
FIG. 8 is a circuit diagram illustrating a configuration of a connection switching circuit between (a) signal lines connected to the touch panel, and (b) drive lines connected to a driver and sense lines connected to a sense amplifier.

FIG. 7 is a block diagram illustrating a configuration of a touch sensor system 1b according to Embodiment 2. FIG. 8 is a circuit diagram illustrating a configuration of a connection switching circuit (multiplexers 4a and 4b) between (a) signal lines HL1 to HLM and VL1 to VLM connected to a touch panel 3, and (b) drive lines DL1 to DLM connected to drivers 5a and 5b and sense lines SL1 to SLM connected to sense amplifiers 6a and 6b. Components identical to those described above are provided with identical reference signs, and detailed descriptions thereof are not repetitively provided.

The touch sensor system 1b includes a capacitance distribution detection circuit 2a. The capacitance distribution detection circuit 2a includes two multiplexers, 4a and 4b. The multiplexer 4a is connected to the touch panel 3 in a fixed manner, via the signal lines HL1 to HLM. The capacitance distribution detection circuit 2a includes the driver 5a and the sense amplifier 6a. The driver 5a is connected to the multiplexer 4a via the drive lines DL1 to DLM, and the sense amplifier 6a is connected to the multiplexer 4a via the sense lines SL1 to SLM.

The capacitance distribution detection circuit 2a includes an A/D converter 8a and a timing generator 7a. The A/D converter 8a converts an output from the sense amplifier 6a from analog to digital, and supplies this converted output to a capacitance distribution calculation section 9. The timing generator 7a generates (i) a signal specifying an operation of the driver 5a, (ii) a signal specifying an operation of the sense amplifier 6a, and (iii) a signal specifying an operation of the A/D converter 8a, and supplies these signals to the driver 5a, the sense amplifier 6a, and the A/D converter 8a, respectively. The timing generator 7a supplies a signal for controlling the multiplexer 4a, via a control line CLa.

The multiplexer 4b is connected to the touch panel 3 in a fixed manner via the signal lines VL1 to VLM. The capacitance distribution detection circuit 2a includes the driver 5b and the sense amplifier 6b. The driver 5b is connected to the multiplexer 4b via the drive lines DL1 to DLM and the sense amplifier 6b is connected to the multiplexer 4b via the sense lines SL1 to SLM.

The capacitance distribution detection circuit 2a includes an A/D converter 8b and a timing generator 7b. The A/D converter 8b converts an output from the sense amplifier 6b from analog to digital, and supplies this converted output to the capacitance distribution calculation section 9. The timing generator 7b generates (i) a signal specifying an operation of the driver 5b, (ii) a signal specifying an operation of the sense amplifier 6b, and (iii) a signal specifying an operation of the A/D converter 8b, and supplies these signals to the driver 5b, the sense amplifier 6b, and the A/D converter 8b, respectively. The timing generator 7b supplies a signal for controlling the multiplexer 4b, via the control line CLb.

The capacitance distribution detection circuit 2a includes a sync signal generation section 11. The sync signal generation section 11 generates a sync signal for the timing generators 7a and 7b to control the multiplexers 4a and 4b to cause the switching over between (a) a first connection state in which the signal lines HL1 to HLM are connected to the driver 5a and the signal lines VL1 to VLM are connected to the sense amplifier 6b and (b) a second connection state in which the signal lines HL1 to HLM are connected to the sense amplifier 6a and the signal lines VL1 to VLM are connected to the driver 5b, and supplies the generated sync signal to the timing generators 7a and 7b.

Figure 9:
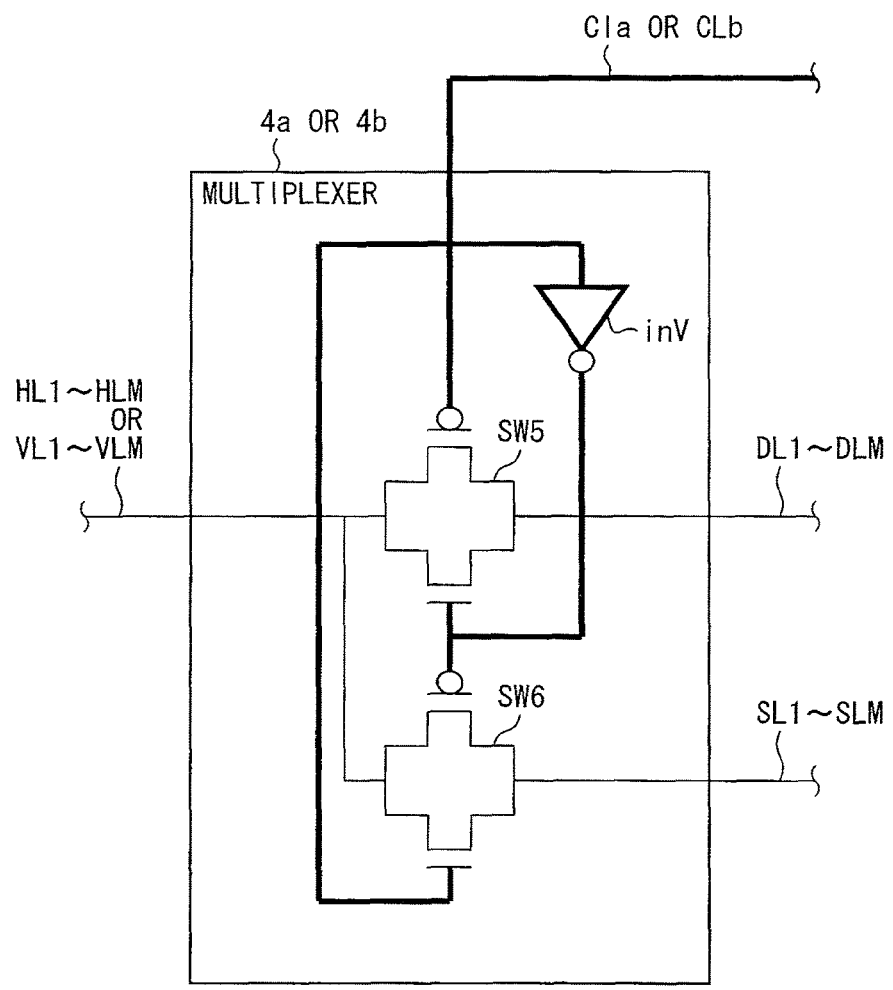
FIG. 9 is a circuit diagram illustrating a configuration of a multiplexer provided in a capacitor distribution detection circuit of the touch sensor system.

FIG. 9 is a circuit diagram illustrating a configuration of the multiplexers 4a and 4b provided in the capacitor distribution detection circuit 2a of the touch sensor system 1b. The multiplexer 4a includes two CMOS switches SW5 and SW6 that are connected in series. A signal from the timing generator 7a via the control line CLa is inputted from (i) one end of the CMOS switch SW5 opposite of the CMOS switch SW6, (ii) one end of the CMOS switch SW6 opposite of the CMOS switch SW5, and (iii) a terminal input of a reverser inv. The reverser inv has its output be inputted between the CMOS switch SW5 and CMOS switch SW6. The signal lines HL1 to HLM are connected to the CMOS switches SW5 and SW6. The drive lines DL1 to DLM are connected to the CMOS switch SW5. The sense lines SL1 to SLM are connected to the CMOS switch SW6.

(Operation of Touch Sensor System 1b)
When a signal of the control line CLa is made Low, the signal lines HL1 to HLM become connected to the drive lines DL1 to DLM. When the signal of the control line CLa is made High, the signal lines HL1 to HLM become connected to the sense lines SL1 to SLM. The multiplexer 4b is also configured similarly to this.

As such, the touch sensor system 1b includes the multiplexers 4a and 4b having similar configurations; the multiplexer 4a is connected to the signal lines HL1 to HLM of the touch panel 3 in a fixed manner, and the multiplexer 4b is connected to the signal lines VL1 to VLM of the touch panel 3 in a fixed manner. Furthermore, the multiplexers 4a and 4b are operated in sync, based on a sync signal generated by the sync signal generation section 11. When the multiplexer 4a is connected to the driver 5a, the multiplexer 4b is connected to the sense amplifier 6b, and when the multiplexer 4a is connected to the sense amplifier 6a, the multiplexer 4b is connected to the driver 5b.

(Embodiment 3)

Figure 10:
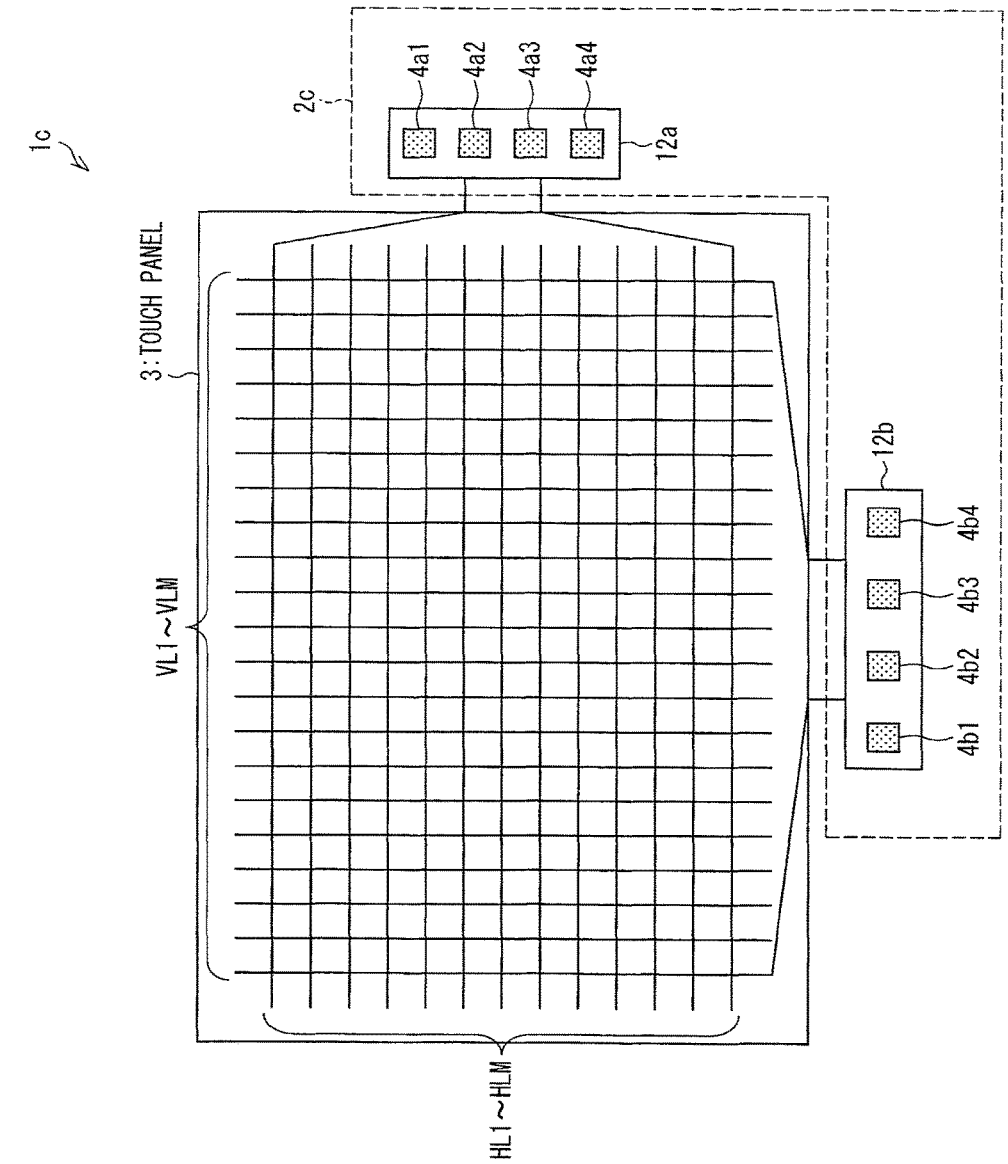
FIG. 10 is a block diagram illustrating a configuration of a touch sensor system according to Embodiment 3.

FIG. 10 is a block diagram illustrating a configuration of a touch sensor system 1c according to Embodiment 3. Components identical to those described above are provided with identical reference signs, and detailed descriptions thereof are not repetitively provided.

The touch sensor system 1c includes a capacitance distribution detection circuit 2c. The capacitance distribution detection circuit 2c includes controllers 12a and 12b. The controller 12a includes multiplexers 4a1 to 4a4. The multiplexers 4a1 to 4a4 have configurations similar to that of the multiplexer 4a described above with reference to FIG. 7 through FIG. 9, however is connected to a fewer number of signal lines; the multiplexer 4a1 is connected to signal lines HL1 to HL(m1), the multiplexer 4a2 is connected to signal lines HL(m1+1) to HL(m2), the multiplexer 4a3 is connected to signal lines HL(m2+1) to HL(m3), and the multiplexer 4a4 is connected to signal lines HL(m3+1) to HLM, where $1<m1<m2<m3<M$.

The controller 12b includes multiplexers 4b1 to 4b4. The multiplexers 4b1 to 4b4 have configurations similar to that of the multiplexer 4b described above with reference to FIG. 7 through FIG. 9, however is connected to a fewer number of signal lines; the multiplexer 4b1 is connected to signal lines VL1 to VL(k1), the multiplexer 4b2 is connected to signal lines VL(k1+1) to VL(k2), the multiplexer 4b3 is connected to signal lines VL(k2+1) to VL(k3), and the multiplexer 4b4 is connected to signal lines VL(k3+1) to VLM, where $1<k1<k2<k3<M$.

The multiplexers 4a1 to 4a4 and the multiplexers 4b1 to 4b4 each include respective drivers, sense amplifiers, timing generators, and ADC, and operate in sync based on a sync signal generated by a sync signal generation section. The controllers 12a and 12b may be fabricated as an integrated circuit (IC).

In the touch sensor system 1c, control is carried out to switch between (a) a first connection state in which the signal lines HL1 to HL(m1), the signal lines HL(m1+1) to HL(m2), the signal lines HL(m2+1) to HL(m3), and the signal lines HL(m3+1) to HLM are connected to a driver and the signal lines VL1 to VL(k1), the signal lines VL(k1+1) to VL(k2), the signal lines VL(k2+1) to VL(k3), and the signal lines VL(k3+1) to VLM are connected to a sense amplifier, and (b) a second connection state in which the signal lines HL1 to HL(m1), the signal lines HL(m1+1) to HL(m2), the signal lines HL(m2+1) to HL(m3), and the signal lines HL(m3+1) to HLM are connected to a sense amplifier and the signal lines VL1 to VL(k1), the signal lines VL(k1+1) to VL(k2), the signal lines VL(k2+1) to VL(k3), and the signal lines VL(k3+1) to VLM are connected to a driver.

(Embodiment 4)

Figure 11:
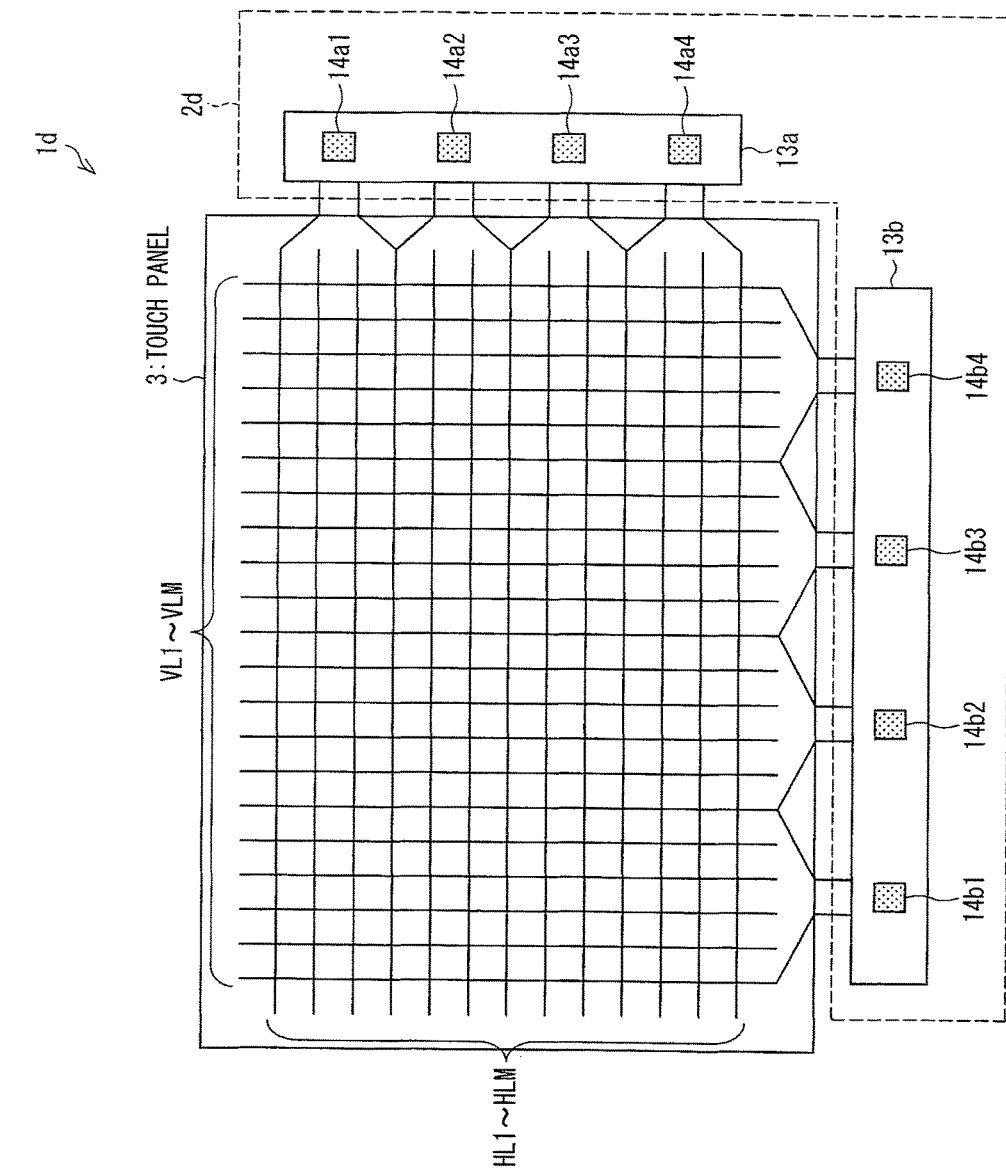
FIG. 11 is a block diagram illustrating a configuration of a touch sensor system according to Embodiment 4.
Figure 12:
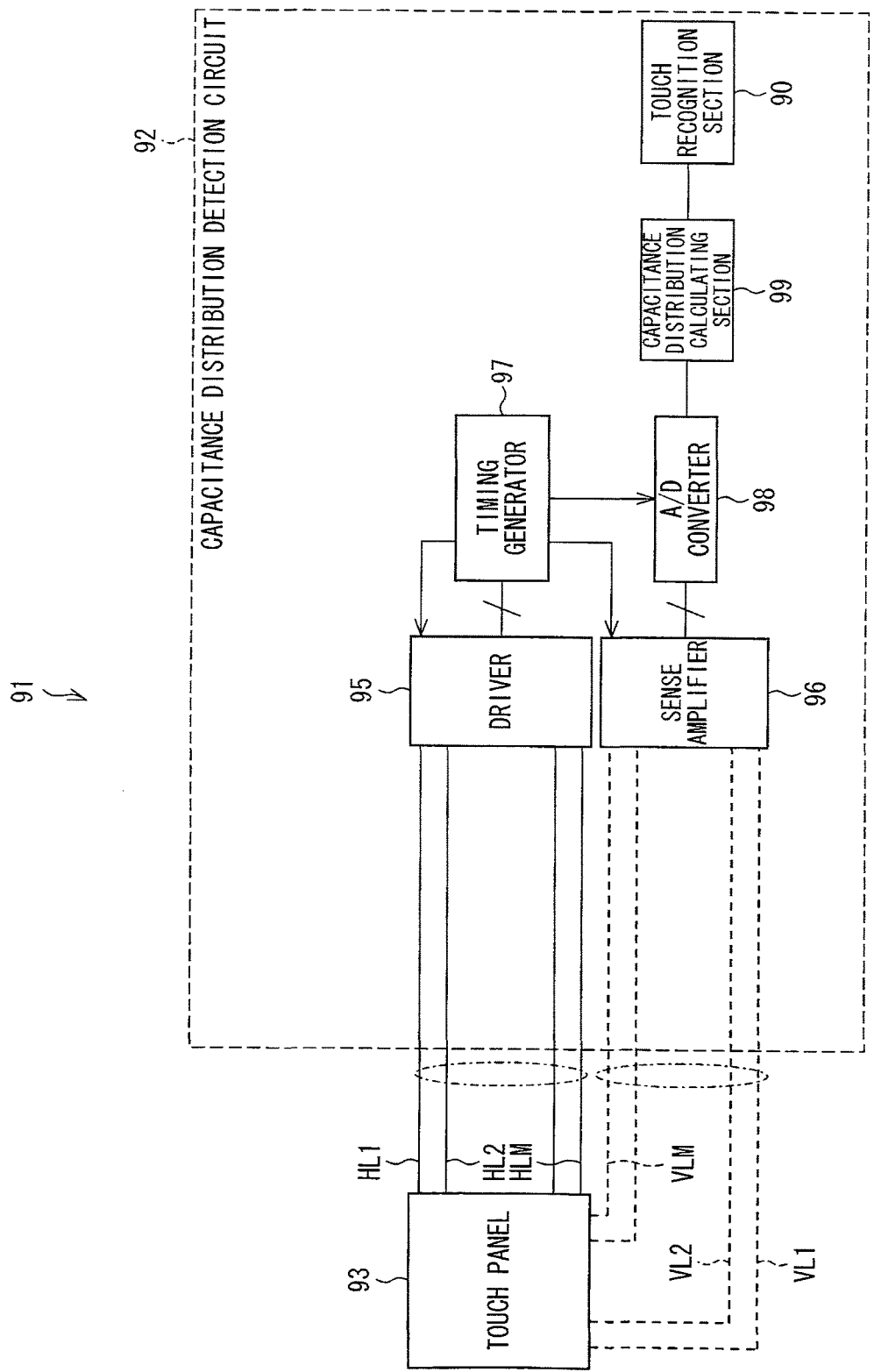
FIG. 12 is a block diagram illustrating a configuration of a conventional touch sensor system.
Figure 13:
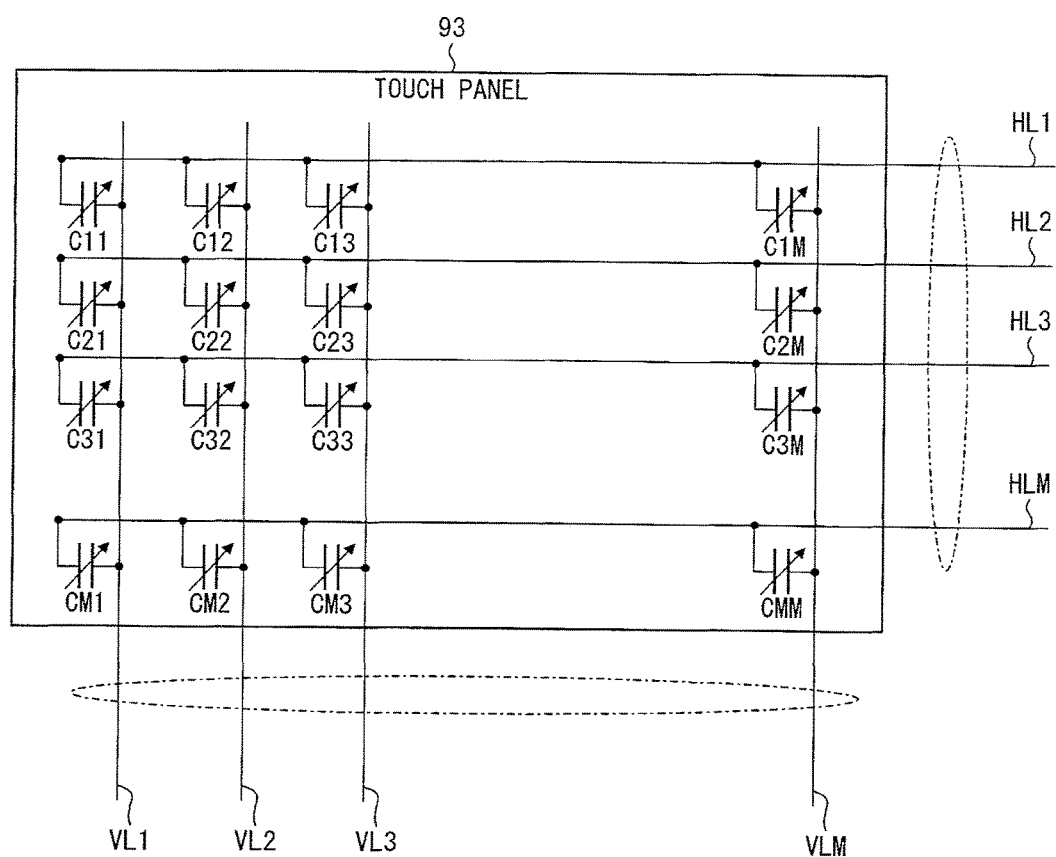
FIG. 13 is a schematic view illustrating a configuration of a touch panel provided in the touch sensor system.

FIG. 11 is a block diagram illustrating a configuration of a touch sensor system 1d according to Embodiment 4. Components identical to those described above are provided with identical reference signs, and detailed descriptions thereof are not repetitively provided.

A sense amplifier of the touch sensor system 1d includes a configuration to read out a signal from adjacent sense lines upon subtraction, allowing for canceling noise from a liquid crystal panel and the like and improve SNR.

The touch sensor system 1d includes a capacitance distribution detection circuit 2d. The capacitance distribution detection circuit 2d includes controllers 13a and 13b. The controller 13a includes multiplexers 14a1 to 14a4. The multiplexers 14a1 to 14a4 have configurations similar to that of the multiplexer 4a described above with reference to FIG. 7 to FIG. 9, however is connected to a fewer number of signal lines, and adjacent multiplexers share a signal line that is disposed on their common boundary.

The multiplexer 14a1 is connected to signal lines HL1 to HL(m1), the multiplexer 14a2 is connected to signal lines HL(m1) to HL(m2), the multiplexer 4a3 is connected to signal lines HL(m2) to HL(m3), and the multiplexer 4a4 is connected to signal lines HL(m3) to HLM, where $1<m1<m2<m3<M$. As such, adjacent multiplexers 14a1 and 14a2 share the signal line HL(m1) disposed on their common boundary, adjacent multiplexers 14a2 and 14a3 share the signal line HL(m2) disposed on their common boundary, and adjacent multiplexers 14a3 and 14a4 share the signal line HL(m3) disposed on their common boundary.

The controller 13b includes multiplexers 14b1 to 14b4. The multiplexers 14b1 to 14b4 have configurations similar to that of the multiplexer 4b described above with reference to FIG. 7 to FIG. 9, however is connected to a fewer number of signal lines, and adjacent multiplexers share a signal line disposed on their common boundary.

The multiplexer 14b1 is connected to signal lines VL1 to VL(k1), the multiplexer 14b2 is connected to signal lines VL(k1) to VL(k2), the multiplexer 14b3 is connected to signal lines VL(k2) to VL(k3), and the multiplexer 14b4 is connected to signal lines VL(k3) to VLM, where $1<k1<k2<k3<M$. As such, adjacent multiplexers 14b1 and 14b2 share the signal line VL(k1) disposed on their common boundary, adjacent multiplexers 14b2 and 14b3 share the signal line VL(k2) disposed on their common boundary, and adjacent multiplexers 14b3 and 14b4 share the signal line VL(k3) disposed on their common boundary.

The multiplexers 14a1 to 14a4 and the multiplexers 14b1 to 14b4 each include respective drivers, sense amplifiers, timing generators, and ADC, and operate in sync based on a sync signal generated by a sync signal generation section. The controllers 13a and 13b may be fabricated as an integral circuit (IC).

As such, in a case in which the sense amplifier is configured so as to read out a signal from adjacent sense lines upon subtraction, to allow for canceling noise from the liquid crystal panel and the like and improve SNR, by sharing a signal line disposed on a common boundary of adjacent multiplexers, it is possible to continuously carry out differential read-out of sense lines disposed on the boundary of the sense lines corresponding to the adjacent multiplexers in a manner exceeding that boundary.

The touch sensor systems according to Embodiments 1 to 4 may be constituted in a media blackboard (information input/output device) capable of receiving input by being handwritten thereon while a plurality of persons touch the blackboard, by superposing the touch sensor system with a liquid crystal display panel or by building the touch sensor system inside a liquid crystal display panel.

With the capacitance distribution detection method according to the present embodiment, it is preferable that the plurality of first signal lines, the plurality of second signal lines, and the plurality of capacitors constitute a touch panel, the touch panel being of a size allowing for a hand that holds a pen for input to be placed thereon.

According to the configuration, it is possible to eliminate an effect caused by electromagnetic noise inputted into a touch panel via a hand touched on the touch panel while holding a pen for input, and which electromagnetic noise is superposed on a signal of a sense line.

With the capacitance distribution detection circuit according to the present embodiment, it is preferable that the plurality of first signal lines, the plurality of second signal lines, and the plurality of capacitors constitute a touch panel, the touch panel being of a size allowing for a hand that holds a pen for input to be placed thereon.

According to the configuration, it is possible to eliminate an effect caused by electromagnetic noise inputted into a touch panel via a hand touched on the touch panel while holding a pen for input, and which electromagnetic noise is superposed on a signal of a sense line.

With yet another capacitance distribution detection circuit according to the present embodiment, it is preferable that the portion of the plurality of first signal lines and the another portion of the plurality of first signal lines share a signal line disposed on their common boundary, and the portion of the plurality of second signal lines and the another portion of the plurality of second signal lines share a signal line disposed on their common boundary.

With the foregoing configuration, it is possible to continuously carry out differential read-out of a sense line disposed on a common boundary of portions of adjacent multiplexers, exceeding the common boundary.

With a touch sensor system according to the present embodiment, it is preferable that the capacitance distribution detection circuit detects a distribution of capacitance in accordance with an input with use of a pen.

With an information input/output device according to the present embodiment, it is preferable that the capacitance distribution detection circuit detects a distribution of capacitance in accordance with an input with use of a pen.

The present invention is not limited to the description of the embodiments above, but may be altered by a skilled person within the scope of the claims. An embodiment based on a proper combination of technical mans disclosed in different embodiments is encompassed in the technical scope of the present invention.

INDUSTRIAL APPLICABILITY

The present invention is applicable to a capacitance distribution detection method, a capacitance distribution detection circuit, a touch sensor system, and an information input/output device, each of which detects a distribution of capacitance of a plurality of capacitors each formed on intersections of a plurality of first signal lines with a plurality of second signal lines.

Moreover, the present invention can be used in a touch sensor system including a large-sized touch panel in which a hand placing region would occur when entering with use of a pen, for example, a media blackboard, a tablet terminal, and the like, which is capable of receiving entry via handwriting on the blackboard by a plurality of persons.

REFERENCE SIGNS LIST 1a touch sensor system
2 capacitance distribution detection circuit
3 touch panel
4 multiplexer
4a multiplexer (first multiplexer)
4b multiplexer (second multiplexer)
4a1 multiplexer (first multiplexer)
4a2 multiplexer (second multiplexer)
4b1 multiplexer (third multiplexer)
4b2 multiplexer (fourth multiplexer)
14a1 multiplexer (first multiplexer)
14a2 multiplexer (second multiplexer)
14b1 multiplexer (third multiplexer)
14b2 multiplexer (fourth multiplexer)
5 driver
5a driver (first driver)
5b driver (second driver)
6 sense amplifier
6a sense amplifier (first sense amplifier)
6b sense amplifier (second sense amplifier)
7 timing generator
7a timing generator (control circuit)
7b timing generator (control circuit)
8 A/D converter
9 capacitance distribution calculation section
10 touch recognition section
11 sync signal generation section (control circuit)
12a, 12b, 13a, 13b controller
HL1-HLM signal line (first signal line)
VL1-VLM signal line (second signal line)
C11-CMM capacitor
DL1-DLM drive line
SL1-SLM sense line
SW1-SW4 switch
HDR hand placing region
L1-L4 circumscribing line
P pen input position
NZ phantom noise

The invention claimed is:

1. A method of specifying a touched position on a touch panel, including a plurality of first signal lines and a plurality of second signal lines which intersect with the plurality of first signal lines, by detecting a distribution of capacitance of a plurality of capacitors that are each formed on intersections of the plurality of first signal lines with the plurality of second signal lines, the method comprising:

a first capacitance distribution detecting step of detecting a first capacitance distribution on the touch panel in accordance with electric charges corresponding to the plurality of capacitors which electric charges are outputted from the plurality of second signal lines by driving the plurality of first signal lines;

a first touched position specifying step of specifying a first touched position on the touch panel in accordance with the first capacitance distribution;

a second capacitance distribution detecting step of detecting a second capacitance distribution on the touch panel in accordance with electric charges corresponding to the plurality of capacitors which electric charges are outputted by the plurality of first signal lines by driving the plurality of second signal lines; and a second touched position specifying step of specifying a second touched position on the touch panel in accordance with the second capacitance distribution, wherein one of the first touched position, specified in the first touched position specifying step, and the second touched position, specified in the second touched position specifying step, is received as the touched position, wherein:

a generation status of noise on the plurality of second signal lines is checked in accordance with the first capacitance distribution;

a generation status of noise on the plurality of first signal lines is checked in accordance with the second capacitance distribution;

in the first touched position specifying step, in a case where (i) the noise is generated on any of the plurality of second signal lines and (ii) the first touched position cannot be specified, the second touched position specified in the second touched position specifying step is received as the touched position; and in the second touched position specifying step, in a case where (i) the noise is generated on any of the plurality of first signal lines and (ii) the second touched position cannot be specified, the first touched position specified in the first touched position specifying step is received as the touched position.

2. The method as set forth in claim 1, wherein:

in the first touched position specifying step, a first touched position signal for specifying the first touched position is detected;

in the second touched position specifying step, a second touched position signal for specifying the second touched position is detected;

a position specified in accordance with a signal obtained by carrying out an AND operation with use of the first touched position signal and the second touched position signal is received as the touched position.

3. The method as set forth in claim 2, wherein:

first phantom noise is generated between a first pair of circumscribing lines that circumscribe a finger-touched region, which correspond to the touched position, along the plurality of first signal lines;

second phantom noise is generated between a second pair of circumscribing lines that circumscribe the finger-touched region along the plurality of second signal lines; and the first phantom noise and the second phantom noise are cancelled in the signal obtained by carrying out the AND operation.

4. A touched position specifying circuit for specifying a touched position on a touch panel, including a plurality of first signal lines and a plurality of second signal lines which intersect with the plurality of first signal lines, by detecting a distribution of capacitance of a plurality of capacitors that are each formed on intersections of the plurality of first signal lines with the plurality of second signal lines, the touched position specifying circuit comprising:

a multiplexer connected to the plurality of first signal lines and the plurality of second signal lines;

a driver connected to the multiplexer;

a sense amplifier connected to the multiplexer; and a touched position specifying section connected to the sense amplifier, the touched position specifying section calculating the touched position by signal conversion, the multiplexer switching a connection state between a first connection state and a second connection state, the first connection state being a state in which the plurality of first signal lines are connected to the driver and the plurality of second signal lines are connected to the sense amplifier so that (i) drive signals are applied to the plurality of first signal lines via the driver, (ii) electric charges corresponding to the plurality of capacitors are outputted from the plurality of second signal lines, (iii) a first capacitance distribution on the touch panel is detected in accordance with the electric charges, and (iv) the touched position specifying section specifies a first touched position on the touch panel in accordance with the first capacitance distribution, the second connection state being a state in which the plurality of first signal lines are connected to the sense amplifier and the plurality of second signal lines are connected to the driver so that (I) drive signals are applied to the plurality of second signal lines via the driver, (II) electric charges corresponding to the plurality of capacitors are outputted from the plurality of first signal lines, (III) a second capacitance distribution on the touch panel is detected in accordance with the electric charges, and (IV) the touched position specifying section specifies a second touched position on the touch panel in accordance with the second capacitance distribution, wherein one of the first touched position, specified in the first connection state, and the second touched position, specified in the second connection state, is received as the touched position wherein:

a generation status of noise on the plurality of second signal lines is checked in accordance with the first capacitance distribution;

a generation status of noise on the plurality of first signal lines is checked in accordance with the second capacitance distribution;

in the first connection state, in a case where (i) the noise is generated on any of the plurality of second signal lines and (ii) the first touched position cannot be specified, the second touched position specified in the second connection state is received as the touched position; and in the second connection state, in a case where (i) the noise is generated on any of the plurality of first signal lines and (ii) the second touched position cannot be specified, the first touched position specified in the first connection state is received as the touched position.

5. The touched position specifying circuit as set forth in claim 4, wherein:

in the first connection state, a first touched position signal for specifying the first touched position is detected from the plurality of second signal lines;

in the second connection state, a second touched position signal for specifying the second touched position is detected from the plurality of first signal lines;

a position specified in accordance with a signal obtained by carrying out an AND operation with use of the first touched position signal and the second touched position signal is received as the touched position.

* * * * *